United States Patent
Torney et al.

(10) Patent No.: US 8,548,817 B2
(45) Date of Patent: Oct. 1, 2013

(54) METHOD FOR DESIGNING AN ORAL PET PRODUCT USING BIOMETRIC ANALYSIS

(75) Inventors: Allan A. Torney, Brampton (CA); Emine Unlu, Murfreesboro, TN (US); Neil Willcocks, Brentwood, TN (US); Kasim Zubair, Brompton (CA); Tiffany Bierer, Brentwood, TN (US)

(73) Assignee: Mars, Incorporated, McLean, VA (US)

(*) Notice: Subject to any disclaimer, the term of this patent is extended or adjusted under 35 U.S.C. 154(b) by 1835 days.

(21) Appl. No.: 11/821,000

(22) Filed: Jun. 21, 2007

(65) Prior Publication Data

US 2008/0010080 A1    Jan. 10, 2008

Related U.S. Application Data

(60) Provisional application No. 60/815,686, filed on Jun. 21, 2006.

(51) Int. Cl.
| | |
|---|---|
| G06Q 30/02 | (2012.01) |
| G06Q 10/10 | (2012.01) |
| G06Q 10/06 | (2012.01) |
| G06Q 30/06 | (2012.01) |
| G06Q 10/08 | (2012.01) |

(52) U.S. Cl.
USPC .......................................................... 705/1.1

(58) Field of Classification Search
None
See application file for complete search history.

(56) References Cited

U.S. PATENT DOCUMENTS

| | | |
|---|---|---|
| 5,240,720 A | 8/1993 | Axelrod |
| 2004/0091590 A1* | 5/2004 | Abene et al. ................... 426/302 |
| 2004/0099224 A1* | 5/2004 | Russell-Maynard et al. . 119/709 |
| 2006/0045909 A1 | 3/2006 | Friesen et al. |
| 2006/0292288 A1 | 12/2006 | Maynard |
| 2007/0148282 A1* | 6/2007 | Zubair et al. ...................... 426/2 |

FOREIGN PATENT DOCUMENTS

EP    1440622 A    7/2004

* cited by examiner

*Primary Examiner* — Jonathan Ouellette
(74) *Attorney, Agent, or Firm* — Christopher D. Brandt; Tracey S. Truitt; Polsinelli PC (57) ABSTRACT

Methods are provided for designing an oral dog product that is safe and functionally effective for a class of dogs. A product is formulated and/or shaped based on biometric analysis of the capabilities of the class of dogs.

36 Claims, 6 Drawing Sheets

| Formula | Equation | Definitions |
|---|---|---|
| Biting Force | BF = 2(M*m+T*t)/o | M - area proportional to the masseter/medial pterygoid muscle * 30MPa |
| | | T - area proportional to the temporalis muscle *30 Mpa |
| | (Thomason, 1991) | m - lever arm for M |
| | | o - Jaw length |
| | | t - lever arm for T |
| Maximum Biting Force | BF = (Lm*M/Lc)+(Lt*T/Lc) | Lm - length of the masseter origination scar |
| | | M - the rectangular area of the masseter origination scar |
| | | Lc - distance from the jaw joint to the rear of the canine alveolus |
| | (Kiltie, 1984) | Lt - the height of the coronid above the jaw condyle |
| | | T - the rectangular area of the temporalis origination scar |
| Relative Blade Length | RBL = BL/M1L | BL - Blade length of carnassial tooth (M1) |
| | (Van Valkenburgh, 1989) | M1L - length of M1 |
| Relative Grinding Area | RGA = sqrt(TGA)/BL | TGA - Total grinding area ( = area M2 + area M3 + non-shearing portion of area M1) |
| | (Van Valkenburgh, 1989) | BL - Blade length of carnassial tooth (M1) |
| Maximum Gape | MG = angle between lines O & I | O - Line from the jaw joint to the midpoint of the temporalis fiber along the top of the skull |
| | MG = Ratio (O/I) | I - Line from the jaw joint to the dorsal point of |
| | (Emerson & Radinsky, 1980) | the coronoid process |
| Relative Gape | RMG - proportional to jaw length | RMG - The length of the lower jaw measured at the canine |
| | (Kiltie, 1984) | |
| Relative Maximum Strength of Canines | Sx = Ix/F*h*b | Ix - (pie*a*b^3)/4 |
| | Sy = Iy/F*h*a | Iy - (pie*b*a^3)/4 |
| | | F - Force, set to 1 |
| | | h - Crown Height |
| | (Van Valkenburgh, 1987) | a - Half the anteroposterior diameter of the canine |
| | | b - Half the mediolateral diameter of the canine |
| Facial Rotation | FR = angle between lines T & B (angle of cranial flexion) | T - Line drawn along the upper tooth row |
| | (Emerson & Radinsky, 1980) | B - Line drawn along the basicranial axis |

METHOD FOR DESIGNING AN ORAL PET PRODUCT USING BIOMETRIC ANALYSIS

This application claims the benefit of U.S. Provisional Application No. 60/815,686, filed Jun. 21, 2006, which is incorporated herein by reference.

BACKGROUND OF THE INVENTION

1. Field of the Invention

The present invention relates generally to designing oral pet products, and more particularly to formulating and marketing various oral pet products based on biometric analysis of capabilities among different classes of pets for improved safety and functional effectiveness.

2. Description of Related Art

Conventional oral pet products, including chews and kibbles, are designed principally according to pets' body weight. That is, taking for example dogs, most oral dog products are available in small, medium and large sizes, in order to accommodate dogs of small, medium and large body size, respectively. Indeed, the packaging of many conventional oral dog products include labels advising consumers on how appropriate the given product may be for their pet. One example is IAMS® TARTAR TREATS™. The packaging of these edible dental chews indicates product appropriateness as being "For Small Dogs (20 lbs or less), For Medium Dogs (21-50 lbs), For Large Dogs (51 lbs or more)". These product ranges commonly only vary in overall size of the product with smaller sizes designed for smaller dogs and larger sizes formulated for larger dogs. Product shapes, dimension ratios and textures of the different product sizes, however, remain constant.

A significant drawback of formulating and marketing oral products for pets based solely on body weight is that doing so fails to account for more fundamental anatomical, and particularly morphological, considerations of the animal. As just one example, dogs, an anatomically diverse species, generally possess one of three very distinct skull shapes, all of which provide a very different mouth shape and function. Accordingly, both safety and functional effectiveness are overlooked with conventional products that differ only for dog size, thereby exposing dogs to potential injury and even causing an inadvertent increased risk of death.

The failure to account for additional anatomical considerations has resulted in an increasing number of pet injuries and deaths from hazardous or, more commonly, ill-suited oral products. Choking frequently results when the pets, particularly dogs and cats, are unable to break apart a given product, such as a chew, because the texture of the chew is too hard for that class of pet to bite through. Consequently, dogs will swallow the chew, either whole or in large pieces, which it cannot completely chew, which may then become lodged in its throat or in the intestines.

Alternatively, a dog may fracture its tooth on a chew of too hard a texture or an inappropriate shape. Such injuries are common when the respective grooves or contours on a dog chew are inappropriately designed or the chew is too hard for dogs of a certain skull type a factor that determines the orientation of the teeth within the animal's jaw and its biting strength at each tooth position.

The continued recurrence of such pet injuries due to choking or other accidents from oral products clearly evidences that merely scaling down a given oral pet product in order to match the animal's body proportion fails to effectively remedy these ongoing hazards. Accordingly, there is a need for a method of designing and appropriately marketing an oral pet product that applies biometric analysis to capabilities such as bite force and gape size, and determines the distribution of each across various classes of pet including classes defined by skull type, age, breed and/or sex, all in addition to simple body size and weight.

BRIEF DESCRIPTION OF THE INVENTION

The present invention meets the above identified needs by providing a method for designing superior oral pet products using biometric analysis.

In accordance with one embodiment of the present invention, there is provided a method of designing an oral dog product that is safe and functionally effective for a class of dogs that comprises the step of formulating and/or shaping a product based on biometric analysis of the capabilities of the class of dogs.

In accordance with another embodiment of the present invention, there is provided a method of marketing an oral dog product that is safe and functionally effective for a class of dogs that comprises the step of marketing a product based on biometric analysis of the capabilities of the class of dogs.

In accordance with another embodiment of the present invention, there is provided a method for designing an oral dog product that is safe and functionally effective for a plurality of classes of dogs that comprises the step of formulating at least two different products within a product line for at least two different classes of dogs based on biometric analysis of the capabilities of the at least two classes of dogs. The at least two different products are formulated to have different textures and/or shapes based on the biometric analysis.

In accordance with yet another embodiment of the present invention, there is provided a method of marketing an oral dog product that is safe and functionally effective for a plurality of classes of dogs that comprises the step of marketing at least two different products within a product line for at least two different classes of dogs based on biometric analysis of the capabilities of the at least two classes of dogs. The at least two different products are formulated to have different textures and/or shapes based on the biometric analysis.

In accordance with still another embodiment of the present invention, there is provided a method of formulating an oral dog product that is safe and functionally effective for a specific class of dog, the method comprising the steps of selecting a skull type or types of the dog, selecting a size of the dog, and selecting a desired chew location within the dog's mouth. A bite force is then determined based on the selection criteria of the foregoing steps. Finally, a dog chew is formulated to match the bite force of the specific class of dogs.

Accordingly, an object of the present invention is to facilitate the formulation of optimized oral pet products, particularly for dogs, in regard to shape, texture and other aspects and features, based on biometric parameters including, for instance, bite force, while taking into account various classes of dog according to skull type, age and/or breed.

An advantage of the present invention is that it enables those of ordinary skill to design and market oral pet products that take into account more fundamental attributes of the animal including, for instance, skull type, age and/or pattern of chewing.

Another advantage of the present invention is that it may be applied toward formulating superior oral pet products for dogs, as well as for cats.

Another advantage of the present invention is that the products manufactured according to the methods outlined herein can be safer and more functionally effective for dogs across numerous different classes, thereby reducing the incidence of injury and death resulting from choking hazards, GI blockage, tooth breakages and other maladies associated with conventional oral dog products.

Yet another advantage of the present invention is its application to various features of oral canine products including size, shape and texture, for the design of products carefully tailored for various classes of dogs.

Still another advantage of the present invention is that the methods described facilitate the development of products with a particular functional objective such as, for example, oral care and hygiene, as well those of more simple consideration including pets' chewing enjoyment.

Further features and advantages of the present invention, as well as the compositions of embodiments produced thereby, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 3 is a summary of measurements taken on a collection of skull types in accordance with one embodiment of the present invention.

DETAILED DESCRIPTION

I. Overview

The present invention is described in more detail herein in terms of an exemplary embodiment. This is for convenience only and is not intended to limit the application of the present invention.

Generally speaking, the heads of domestic dogs, Canis familiaris, vary considerably in size and shape. Such variation is widely evident, as between the small compact face of a King Charles spaniel to the large elongated face of a greyhound. It has been surprisingly discovered that skull type, more than any other factor, is most important to formulating appropriate oral dog products for various classes.

To formulate an improved oral canine product, methods of performing biometric analyses on numerous elements including bite force and gape size have been developed. Animal studies suggest that differences in skull and dental morphology accompany differences in prey selection, biting force and feeding patterns. Methods for estimating biting force from dry skulls have been developed by Thomason (*Cranial strength in relation to estimated biting forces in some mammals*. Can. J. Zool, 69: 2326-2333 (1991)) and Kiltie (*Size ratios among sympatric neotropical cats*, Oecologica (Berlin), 61: 411-416 (1994)), whose works are incorporated in their entirety by reference herein, by estimating the size of the temporalis and masseter muscles, the major muscle groups involved with mastication, and the distance from jaw joint to the bite point along the jaw.

Further, according to Emerson & Radinsky (*Functional analysis of sabertooth cranial morphology*. Paleobiology, 6(3): 295-312 (1980)), whose work is also incorporated by reference in its entirety, maximum gape is another factor which may affect prey selection and, in the modern dog, optimum oral product size. As well, relative grinding area as discussed by Van Valkenburgh (*Carnivore dental adaptations and diet: a study of trophic diversity within guilds.* Carnivore Behavior, Ecology and Evolution, J. L. Gittleman, ed. Cornell University Press: Ithaca, 410-436 (1989)), also incorporated by reference in its entirety, is an indicator of the degree to which molar teeth are adapted for slicing or grinding. According to Jaslow (*Morphology and digestive efficiency of red foxes (Vulpes vulpes) and grey foxes (Urocyon cinereoargenteus) in relation to diet.* Can. J. Zool. 65:72-79 (1987)), incorporated in its entirety by reference herein, in the wild, carnivorous animals tend to have low relative grinding areas, while more omnivorous animals have higher values. Applying this ratio to modern domestic dogs is believed to aid in understanding how dogs of different skull type and size handle oral products.

Utilizing the foregoing biometric indicators, the methods of the present invention permit the design of better-suited oral products for dogs separated among a plurality of classes.

As used herein, the terms "oral pet product", "oral dog product", "oral canine product" and "oral product" is anything designed to go into a pet's mouth whether ingestable or not. Importantly, while the present invention will be described in terms of an oral dog product, the invention is not intended to be so limited. Indeed, the methods outlined herein may be applicable to designing oral feline products. Oral pet products include, but are not limited to, chews, toys, kibbles and ropes.

A "class" is a particular grouping of dogs according to a morphological and/or biological parameter. A class may be defined according to dogs' skull type, age, breed and sex, as well as body size, weight and proportion. It is understood that the foregoing classes are illustrative only, and in no way limit the present invention.

"Skull type" is used to refer generally to a classification of canine skull shape and size. In the present invention skull types are classified under three basic categories: brachycephalic, mesaticephalic and dolichocephalic.

"Brachycephalic" skull types are characterized by a broad skull base and short muzzle. Such dogs generally include, for example, Boxers, Bulldogs, Boston Terriers and Pekingese.

"Mesaticephalic" skull types are characterized by a moderate head shape with a medium ratio of skull base width to muzzle length. Such dogs generally include, for example, Golden Retrievers, German Shepherds and Siberian Huskies.

"Dolichocephalic" skull types are characterized by a narrow skull base and elongated muzzle. Representative breeds generally include greyhounds, Irish Terriers, Collies and Salukis.

"Capability" or "biometric capability" is a quantification of a given biological observation and/or phenomena of the dog, based on some interaction of various factors. Bite force and maximum gape are just two examples of biometric capabilities, figures from which at least one general characteristic may then be derived. The observations or characteristics may be converted into target objectives for formulation of a specialized oral product. Similarly, a "biometric analysis" is any quantification or calculation of variables, either measured or observed, and manipulated to derive some value indicative of the canine's ability under certain conditions.

Further, "chewing style" defines whether the particular class of dog is a hard chewer or soft chewer. This can be represented by taking the overall variation in bite force within a particular population/class of dogs and dividing them, for example, into a half with the highest bite forces in one group and the lowest in another group. Formulating a product for each would result in a softer chew for the soft chewer population and a harder chew for the hard chewer population.

Along similar lines, "chewing surface" refers to the tooth surface area at the crown of the tooth that first and most directly comes into contact with any oral product. This area of the tooth is where the maximum bite force for that tooth will be exerted and which serves to provide the majority of the chewing action.

Also, "tooth morphology" includes the shape, structure and placement of individual teeth within a dog's mouth.

Furthermore, "oral care" includes any cleaning and general maintenance of the dog's oral hygiene such as removing buildup of plaque, tarter and calculus, regular brushing, maintaining healthy gums and sharpening of the teeth. Examples of oral care may include gnawing on a chew in order to loosen plaque and sharpen teeth.

Similarly, "chewing enjoyment" and "chewing satisfaction" are used herein to denote any gnawing activity that a dog may engage in. Dogs in general enjoy some degree of chewing. In particular, dogs chew for enjoyment or to relieve boredom, or even to attract the attention of their owners. Some dogs need to be provided with an object to chew on to prevent "destructive chewing": for example, chewing shoes or other items that are not intended to be chewed. In addition, many owners believe that chewing calms their animals. Also, while dogs in the wild would use their mouths and jaws much more during the day for catching and eating prey, domestic dogs do not have to use their mouths as often to eat, so may look for something else to chew to relieve their desire.

"Occupancy" is defined herein as a measure of Lasting Time, or a means by which to keep a dog occupied and busy. Chews are commonly used for this purpose and can more effectively serve this purpose if formulated correctly.

II. Method

Figure 1:
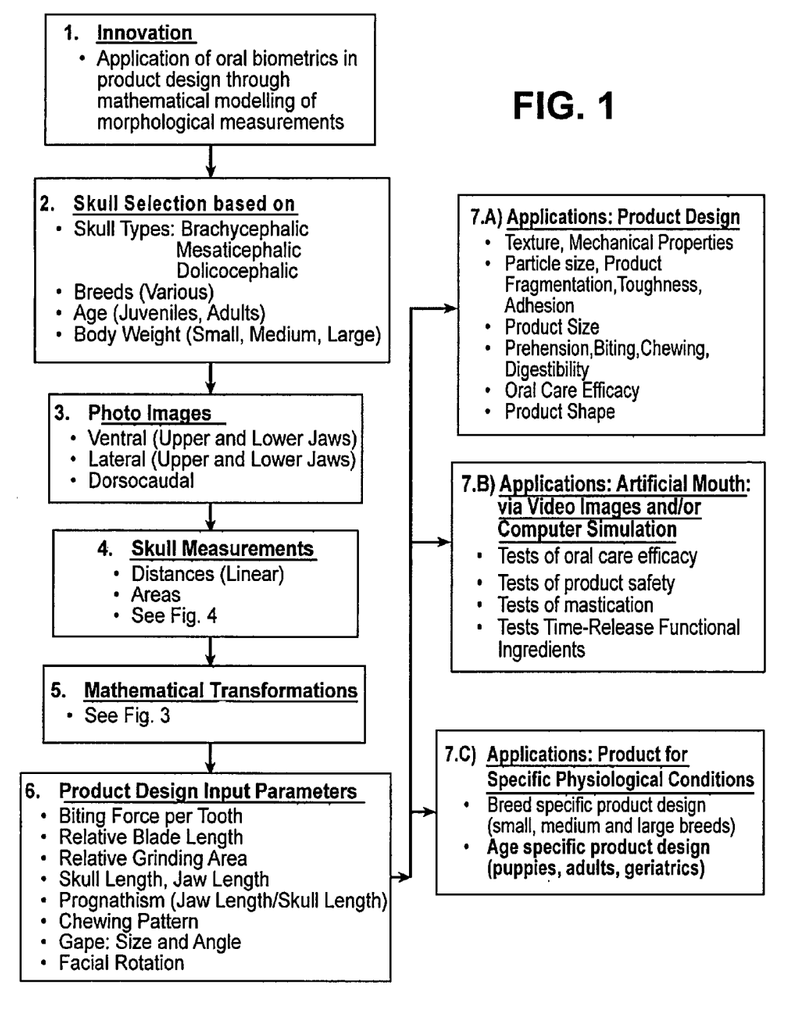
FIG. 1 is a flowchart outlining a method for formulating and/or shaping a product based on biometric analysis of the capabilities of the class of dogs according to one embodiment of the present invention.

FIG. 1 is a flowchart outlining a method for formulating an improved oral dog product according to one embodiment of the present invention. The method may begin with a decision to tailor a product around a specific set of biometric considerations for one class of canine. Such initial planning may include the selection of which type of oral product to formulate (i.e., chew, kibble, etc.), as well as selection of the functional objective the product is intended to accomplish (e.g., oral care instrument).

Once some initial objectives and considerations have been established, a particular class of dogs is selected. The class of dogs may be defined according to a number of considerations including age, weight, breed and sex and the like. Importantly, however, it has been discovered that among such classes, skull type plays a critical role in regard to the various biometric considerations for any proposed oral canine product. The method of the present invention is not limited to selection of a single class of dogs, but may be applied taking into account a plurality of classes at the same time. The at least one class of dog is thus selected for formulation of the oral product.

To perform a biometric analysis, a series of variables is then gathered through observation and measurement of representative dogs of the selected class. This gathering of variables may include, but is not limited to, taking skull measurements, linear distances, areas and visual observations.

The set of variables obtained for members of a particular class are then manipulated into a series of figures for biometric analysis. For example, the particular values measured for skull length and width may be input into a mathematical formula to calculate the bite force of the subject class of canine. It is understood that bite force is only one illustration of a biometric parameter, and in no way limits the present invention. The maximum gape of a dog may likewise be calculated based on values obtained through measurements.

Various guidelines and principles may then be established based on the derived biometric calculations in order to tailor a custom product for the particular class of dogs. For instance, returning to the bite force example, this value may be calculated for various regions in the mouth housing different categories of teeth (canines, premolars, molars). As well, the bite force may be calculated for each individual tooth for optimum formulation. Other biometric capabilities that can be gathered and/or calculated include the maximum gape angle, the relative grinding area and the ratio of jaw length to skull length, as well as observations regarding facial rotation, chewing patterns, and the like.

The foregoing biometric analyses and observations are then applied to product design, as further illustrated in FIG. 1. That is, the specific biometric considerations provide information for quantifiable determinations regarding such aspects of the given product as texture, shape and size, as well other concerns including optimal oral care efficacy, resistance, and product life during use. For instance, studies have indicated that dogs of the brachycephalic class have a smaller bite force than mesaticephalic and dolichocephalic dogs. As a result, brachycephalic dogs may not be able to break apart chew treats that are readily handled by the other two classes and thus may end up swallowing the treat whole. Such knowledge, obtained from biometric analysis according to the present invention, can then be used to select a product texture best suited for the brachycephalic dog, thereby formulating a safer product. For example, to manufacture an oral product with the appropriate texture, specific ingredients may then be selected to achieve the stated objective.

Likewise, a biometric analysis as explained above may also be used to formulate an oral canine product having an improved shape to match the biometric parameters for dogs of a particular class. As explained in more detail in Provisional Application No. 60/815,713, filed Jun. 21, 2006, the entire contents of which are herein incorporated by reference, the particular design of various features of an oral dog product including perhaps, the shaft and the ends, as well as any accompanying grooves and contours thereon, may be better tailored for given classes of dogs according to the present invention. For example, a dog chew may be shaped to fit the bite characteristics of a given class of dogs, to better accommodate both chewing location and the type of teeth within that location. Likewise, biometric analysis of mouth gape provides insight as to the best shape for maximizing the time that a dog of any given class will spend chewing a treat. The present invention thus allows for functional effectiveness in regard to set objectives for an oral product.

The biometric information obtained further allows for better testing of products prior to introduction onto the market. That is, the specific parameters for a given class of dog may be incorporated into hardware and software designed to simulate actual use conditions (bite force, chew patterns, etc.) of a product by a dog.

The foregoing method may also be used for marketing of oral dog products. Presently, most oral canine products are presented to consumers accordingly simply to body size. In contrast, the methods outlined herein present consumers with more information, allowing them to better care for their dogs. Based on biometric analysis of various capabilities among different classes, consumers will be provided with greater diversity of choices for products best suited for their particular animal.

It should also be noted that the present invention may be implemented using hardware, software or a combination thereof and may be implemented in one or more computer systems or other processing systems.

Particular methodology will now be described in accordance with the present invention.

A. Methodology

One exemplary biometric analysis according to the present invention is outlined below. The methodology described herein is intended to illustrate only a single embodiment of the invention.

Two independent skull collections were used to evaluate biting force and other related biometric parameters in modem canine. The OVC (Ontario Veterinary College, Guelph, ON, Canada) canine skull collection consisted of 26 specimens from a variety of breed, size and skull types. All but three of these specimens had the mandible available for data collection, and three specimens had the mandible attached to the skull. Absence of the mandible, or attachment of it to the skull, limited the number measurements that could be taken from that sample. The second skull collection, the SWISS (Albert Heim Foundation, Switzerland) collection, consisted of 81 samples, including mandibles, from a variety of breed, size and skull types. Information on gender and age were only available for the SWISS skull collection. The SWISS collection consisted of 38 dogs and 43 bitches, 7 juveniles and 74 adults, spread evenly across the body size/skull shape categories. Not all skulls were capable of being used for all calculations because of missing data (e.g. missing teeth), and were thus excluded as required.

The specimens were classified as ranging from small (S) (<10 kg), to medium (M) (11-20 kg), to large (L) (>20 kg) body size dogs. Skulls were classified as having a brachycephalic (B) (short & wide), mesaticephalic (M) (medium proportions) or dolichocephalic (D) (long & narrow) shape.

The placement of the skulls into the three categories was based on the ratio of basicranial skull length to total skull length (SL). This ratio provides indication on the degree of skull elongation from the brain case. Because basicranial length was unable to be calculated from some skull photographs, an "estimate" of basicranial skull length to skull length ratio was calculated as the ratio of snout length (to behind tooth M3) to skull length. Regression analysis illustrated the relationship between basicranial SL/SL and estimated basicranial SL/SL to be significant ($P<0.0001$), and so estimated basicranial SL/SL was used to place skulls into shape categories. The mean estimated basicranial SL/SL ratio $(0.583)\pm0.375*StDev$ $(0.0125)$ represented the mesaticephalic skull shape category. Any ratio less than mean–$0.375*StDev$ was classified as brachycephalic and any ratio greater than mean+$0.375*StDev$ was classified as dolichocephalic. This division resulted in good agreement between calculated (above) and visual placement of skulls into the three shape categories. Visual inspection was subsequently used to verify correct category placement.

Figure 2A:
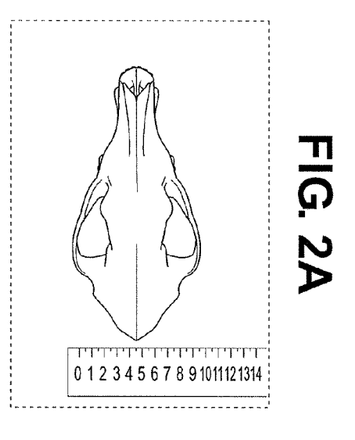
FIG. 2 is an illustration of various measurements conducted on the skull types studied according to one embodiment of the present invention.
Figure 2B:
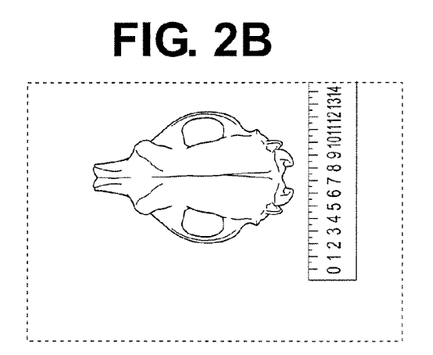
Figure 2C:
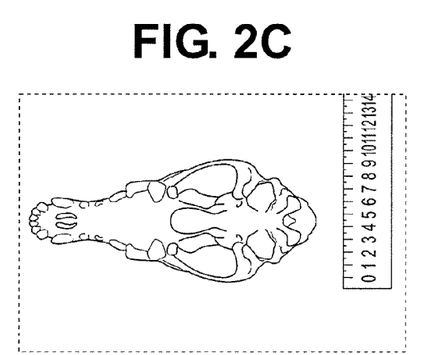
Figure 2D:
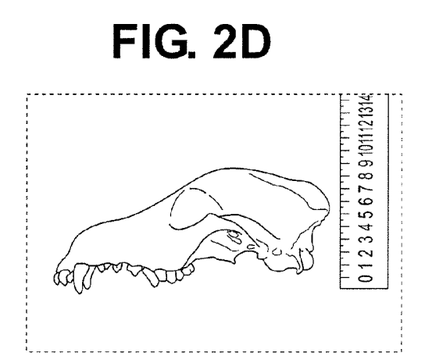
Figure 2E:
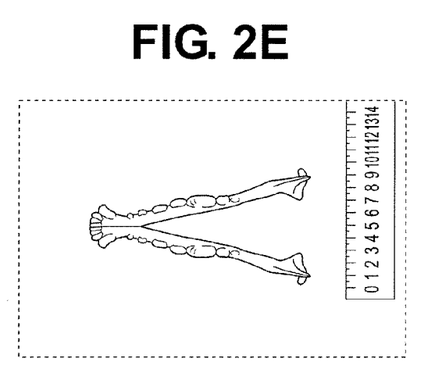
Figure 2F:
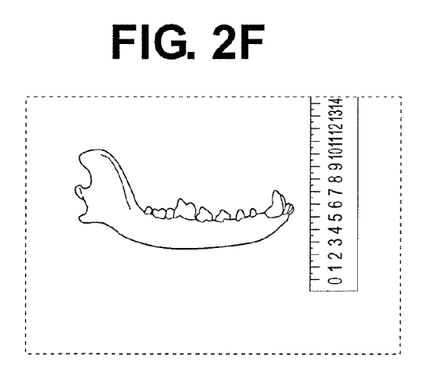

The skulls were digitally photographed from lateral, ventral, dorsocaudal and dorsal views, and mandibles were photographed from lateral and dorsal views. As illustrated in FIG. 2, the photography was conducted in a sandbox, allowing for precise positioning of the skulls, as follows:

a. Lateral view—the palate was positioned perpendicular to the line of the camera, centered at the mid point of the skull (half the height and half the length) (FIG. 2D). The scale was located in a plane halfway between the outer rim of the zygomatic arch and ventral midline of the skull.

b. Ventral view—the skull was positioned perpendicular to the palate, centered at the midpoint of the skull (half the width and half the length) (FIG. 2C). The scale was located in the plane of the palate.

c. Dorsocaudal view—the skull was positioned so that the line of focus of the camera was in the parasaggital plane to the right of the midline, and perpendicular to a line joining the tip of the postorbital process of the frontal bone and the mastoid process, centered at the midpoint of this line (FIG. 2B). The scale was placed in the plane of this line.

d. Dorsal view—the skull was positioned perpendicular to the palate, centered at the midpoint of the skull (half the length and half the width) (FIG. 2A). The scale was located in the plane of the palate.

e. Lateral mandible—the jaw was positioned parallel to the tooth row, centered at the midpoint (half the height and half the length) (FIG. 2 plate F). The scale was located in the plane of the tooth row.

f. Dorsal mandible—the jaw was positioned perpendicular to the tooth row, centered at the midpoint (half the length and half the width) (FIG. 2E). The scale was located in the plane of the tooth row.

The digital photographs were analyzed in Optimas, Version 6.5 (1999). Later, the images were adjusted so that the selected line of axis for each view (described above) (e.g. perpendicular to the palate) was straight. Deviation of this line by a couple of degrees in either direction during skull positioning was common, and Optimas was used to make the appropriate corrections. Ensuring similar orientation of the skulls allowed measurements taken from the images to be compared equally. Using the scale from the photographs, images were calibrated so that measurements taken from the image represent the actual size.

Measurements taken on the skulls are summarized in FIG. 3. Biting force (BF) was calculated according to the following equation from Thomason (1991):

$$\text{Thomason } BF=2(M*m+T*t)/o$$

In the Thomason equation, M represents an area proportional to the masseter/medial pterygoid muscle*30 Mpa, T is an area proportional to the temporalis muscle*30 Mpa, m is a lever arm for M, o is a jaw length, and t is a lever arm for T.

Relative grinding area and relative blade length were calculated as per Van Valkenburgh (1989). Maximum gape and relative maximum gape were calculated as per Emerson & Radinsky (1980) and Kiltie (1984), respectively. Maximum strength of the canine was calculated as per Van Valkenburgh (1987). Facial rotation was calculated as per Emerson & Radinsky (1980).

Biting force values calculated by the Thomason equations were calibrated to "actual" values using the equations developed by Thomason et. al, (*Estimating forces of biting for dogs: calibration with in vivo data*. J. Anim. Sci., in progress. (2005)), also incorporated by reference, where actual bite force values (N) were regression on predicted values. Equations were as follows:

BF@canine (N)=1.440(±0.292)×(Thomason calculated BF@canine, N)+98.082(±102.329)

BF@M2 (N)=2.776(±0.299)×(Thomason calculated BF@M2, N)−320.867(±263.554)

Bite forces at other teeth were calculated by assuming a linear increase in BF from the canine to M3.

It was desirable to obtain an estimate of "actual" gape because such biometric data may be useful for canine product development, suggesting different optimum product sizes for different maximum gapes. The formulas referenced above provide an estimation of "relative gape"—useful for between animal comparisons, but with no indication of actual gape.

Relative gape was calculated according to Emerson & Radinsky (1980) based on the degree of temporalis stretch, a model adapted from the Herring and Herring model (*The superficial masseter and gape in mammals*. The American Naturalist, 108: 561-576 (1974)). The Herring and Herring model was derived from analysis of the superficial masseter muscle; suggesting that longer muscle fibers theoretically allow a greater amount of stretch and thus increased potential maximum gape. It is believed that as the distance from fulcrum to muscle origin line vs. fulcrum to muscle insertion line (=origin/insertion ratio) increases, or as the angle between these lines increases, maximum gape also increases. The origin/insertion ratio and the angle between these lines theoretically describes potential muscle fiber length and, keeping all other factors constant, the longer the muscle fiber, the greater the amount of stretch (Emerson & Radinsky, 1980).

Emerson & Radinsky adapted the Herring & Herring model to evaluate the temporalis muscle, since initial analysis showed that the temporalis is more limiting than the masseter or internal ptyerygoid muscles in restricting gape in felids, the subject of their study. In their model, they compared a theoretical muscle fiber with origin at the midpoint of the dorsal profile of the temporalis fossa and insertion at the apex of the coronoid process. This model of the temporalis muscle was used to estimate a theoretical relative gape for the canine skull collection here (origin/insertion ratio, angle).

It is believed that actual maximum gape may be determined articulating jaws on skulls to the point of disarticulation. According to Emerson & Radinsky, disarticulation of the jaw occurred at about 65° to 70°. Emerson & Radinsky were interested in making comparisons between species, and so articulated jaws on skulls to 65° for a variety of modern and extinct felines. They then estimated the length of the model temporalis muscle fiber with the jaw closed and with the jaw open (using the origin/insertion ratio or angle). The model stretch ratio (MSR) was then calculated, equal to the model fiber with jaw closed/model fiber with jaw opened 65° providing an estimate of muscle fiber stretch for the different feline species, assuming that for different species of felids, the same angle of gape would elicit a different MSR because of cranial modifications.

Figure 4:
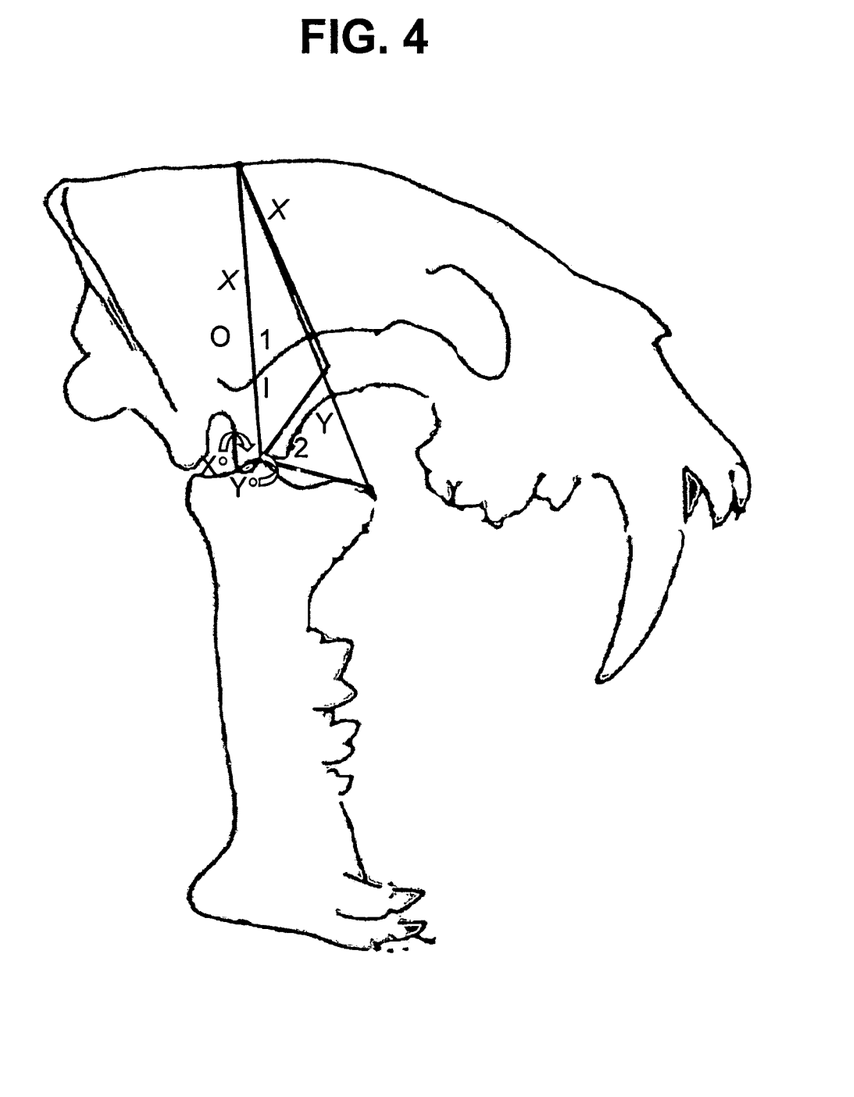
FIG. 4 is an illustration of measurements taken to calculate gape size in accordance with one embodiment of the present invention.

In this study, an attempt was made to use the above relationships to derive estimates of actual gape. The work of Emerson & Radinsky assumes that between species, a given MSR does not elicit the same maximum gape. In order to derive an estimate of actual gape from the origin/insertion ratio and/or angle for this research, it was assumed that within a species, the MSR/gape relationship is constant. Through the following calculations, an estimate of actual gape was obtained from measurements of the origin/insertion ratio and angle for the canine skull collection examined here. FIG. 4 illustrates the measurements taken to estimate the actual gape.

Using data reported by Emerson & Radinsky (1980), a relationship was developed between MSR and the origin/insertion ratio (O/I):

$$MSR=0.5089*(O/I)+2.8862 \quad (R2=0.882) \tag{1}$$

An analysis of variance (ANOVA) in SigmaPlot (2001) shows that this relationship is highly significant (P<0.000.1). In this equation, O and I are known variables. It is also known that:

$$MSR = \text{model muscle fiber with jaw open } (X')/\text{model muscle fiber with jaw closed } (X) \tag{2}$$

X can be determined using the COSINE rule, and if equation (1) is set equal to equation 2, X' can be calculated using the length of O, I, X and the angle between the lines O and I. If Y is the difference between the length of X' and X, it is approximately equal to the amount of stretch in the model temporalis muscle fiber. This assumes that the lines X and X' have the same slope and are parallel. If a triangle is created with the line Y as its base, the angle Y°, originating at the jaw joint, is proportional to the degree of jaw opening and can be solved for by using the SINE and COSINE rules. If the angle Y° is assumed to be the angle of jaw opening, and the distance from jaw joint to canine on the skull and jaw are known, the distance between upper and lower canines at the point of the skull, at maximum gape, can be determined.

As with the estimates of biting force, it is desirable to validate the calculation of maximum gape. The relationship developed by Thomason et. al., (2005) between actual and predicted gape at the incisor, calculated by the above methodology, was as follows:

Actual Gape (cm)=−3.4654(±1.994)×(predicted gape, cm)+0.802(±0.096)

B. Results

Maximum biting force (N) was calculated using the formulas of Thomason, with the adjustment equation of Thomason et al., (2005), for small (<10kg), medium (10-20kg) and large (>20kg) dogs of brachycephalic, mesaticephalic and dolichocephalic skull shape. Results are presented in Tables 1-3.

TABLE 1

Results for Brachycephalic Dogs (Small, Medium & Large)
Brachycephalic

| | Small | | | Medium | | | Large | | |
|---|---|---|---|---|---|---|---|---|---|
| | Mean | SEM | n | Mean | SEM | n | Mean | SEM | n |
| Skull Length (cm) | 8.79 | 0.42 | 6 | 13.46 | 2.01 | 6 | 19.85 | 1.08 | 17 |
| Jaw Length (cm) | 7.70 | 0.23 | 6 | 10.42 | 1.28 | 4 | 16.40 | 0.65 | 16 |
| Skull Width (cm) | 4.61 | 0.10 | 6 | 5.70 | 0.42 | 6 | 7.54 | 0.19 | 17 |
| ratio (estimated basicranial SL/SL)[a] | 0.49 | 0.01 | 5 | 0.47 | 0.01 | 6 | 0.49 | 0.00 | 17 |

TABLE 1-continued

Results for Brachycephalic Dogs (Small, Medium & Large)

| | Brachycephalic | | | | | | | | |
|---|---|---|---|---|---|---|---|---|---|
| | Small | | | Medium | | | Large | | |
| | Mean | SEM | n | Mean | SEM | n | Mean | SEM | n |
| Max strength of canines (mm$^2$) Sx | 0.000104 | 0.000015 | 6 | 0.000372 | 0.000132 | 5 | 0.001569 | 0.000369 | 17 |
| Max strength of canines (mm$^2$) Sy | 0.000180 | 0.000030 | 6 | 0.000607 | 0.000213 | 5 | 0.002962 | 0.000756 | 17 |
| Relative Gape | 7.11 | 0.30 | 7 | 8.47 | 1.16 | 5 | 14.48 | 0.61 | 16 |
| Maximum Gape @ incisor (cm)[b] | 3.11 | 0.343 | 6 | 5.27 | 1.40 | 5 | 10.88 | 0.66 | 16 |
| Maximum Gape @ M1 (cm)[b] | 0.65 | 0.167 | 4 | 3.36 | 0.773 | 3 | 6.00 | 0.427 | 15 |
| Relative blade length (RBL) | 0.72 | 0.04 | 6 | 0.68 | 0.03 | 6 | 0.66 | 0.01 | 17 |
| Relative grinding area (RGA) | 1.48 | 0.22 | 5 | 1.37 | 0.04 | 5 | 1.48 | 0.07 | 17 |
| Facial Rotation (degrees) | 113.21 | 2.41 | 6 | 96.25 | 3.02 | 6 | 90.23 | 2.69 | 17 |
| Thomason biting force @ canine (N)[c] | 303.03 | 8.291 | 6 | 466.78 | 79.06 | 4 | 854.33 | 43.75 | 16 |
| Thomason biting force @ P1 (N) | 388.82 | 5.739 | 5 | 617.38 | 117.48 | 4 | 1191.79 | 62.39 | 15 |
| Thomason biting force @ P2 (N) | 459.75 | 7.755 | 5 | 754.05 | 152.43 | 4 | 1486.30 | 78.60 | 15 |
| Thomason biting force @ P3 (N) | 553.13 | 10.625 | 5 | 933.96 | 198.50 | 4 | 1874.01 | 100.04 | 15 |
| Thomason biting force @ P4 (N) | 656.02 | 13.904 | 5 | 1132.19 | 249.30 | 4 | 2301.21 | 123.73 | 15 |
| Thomason biting force @ M1 (N) | 816.93 | 19.132 | 5 | 1442.19 | 328.78 | 4 | 2969.28 | 160.85 | 15 |
| Thomason biting force @ M2 (N) | 881.10 | 21.234 | 5 | 1565.82 | 360.48 | 4 | 3235.71 | 175.66 | 15 |
| Thomason biting force @ M3 (N) | 911.62 | 22.235 | 5 | 1624.63 | 375.56 | 4 | 3362.44 | 182.71 | 15 |
| Kiltie biting force @ canine[c] | 232.81 | 11.216 | 7 | 344.68 | 51.21 | 4 | 803.47 | 56.99 | 14 |
| Kiltie biting force @ P1 | 234.49 | 10.469 | 5 | 423.53 | 76.20 | 4 | 1120.76 | 81.81 | 13 |
| Kiltie biting force @ P2 | 250.33 | 14.747 | 5 | 495.09 | 99.05 | 4 | 1390.72 | 103.81 | 13 |
| Kiltie biting force @ P3 | 271.18 | 20.449 | 5 | 589.29 | 129.23 | 4 | 1746.11 | 132.85 | 13 |
| Kiltie biting force @ P4 | 294.15 | 26.770 | 5 | 693.09 | 162.53 | 4 | 2137.69 | 164.91 | 13 |
| Kiltie biting force @ M1 | 330.08 | 36.684 | 5 | 855.40 | 214.68 | 4 | 2750.06 | 215.10 | 13 |
| Kiltie biting force @ M2 | 344.40 | 40.644 | 5 | 920.14 | 235.48 | 4 | 2994.28 | 235.13 | 13 |
| Kiltie biting force @ M3 | 351.22 | 42.528 | 5 | 950.93 | 245.38 | 4 | 3110.44 | 244.66 | 13 |
| Total n | | | 7 | | | 6 | | | 17 |
| From OVC Dataset | | | 1 | | | 2 | | | 10 |
| From SWISS Dataset | | | 6 | | | 4 | | | 7 |
| Dogs | | | 4 | | | 1 | | | 4 |
| Bitches | | | 2 | | | 3 | | | 3 |
| Juvenile | | | 0 | | | 0 | | | 1 |
| Adult | | | 6 | | | 4 | | | 6 |

[a]The ratio of the distance from the rear of M3 to the rear of the skull/total skull length
[b]Adjusted using the equations of Thomason et. al, (2005)
[c]Adjusted using the equations of Thomason et. al, (2005)
* All variables are as per Table 2.0

TABLE 2

Results for Mesaticephalic Dogs (Small, Medium & Large)

| | Mesaticephalic | | | | | | | | |
|---|---|---|---|---|---|---|---|---|---|
| | Small | | | Medium | | | Large | | |
| | Mean | SEM | n | Mean | SEM | n | Mean | SEM | n |
| Skull Length (cm) | 13.12 | 1.35 | 6 | 15.87 | 0.93 | 15 | 20.10 | 0.83 | 20 |
| Jaw Length (cm) | 10.81 | 0.66 | 5 | 11.71 | 0.69 | 14 | 15.32 | 0.61 | 20 |
| Skull Width (cm) | 5.29 | 0.09 | 5 | 5.80 | 0.22 | 14 | 6.96 | 0.18 | 20 |
| ratio (estimated basicranial SL/SL)[a] | 0.43 | 0.01 | 6 | 0.44 | 0.01 | 15 | 0.44 | 0.00 | 20 |
| Max strength of canines (mm$^2$) Sx | 0.000221 | 0.000048 | 5 | 0.000513 | 0.000191 | 15 | 0.001893 | 0.001164 | 20 |
| Max strength of canines (mm$^2$) Sy | 0.000344 | 0.000070 | 5 | 0.001404 | 0.000711 | 15 | 0.003414 | 0.002158 | 20 |
| Relative Gape | 8.79 | 0.93 | 6 | 10.30 | 0.62 | 14 | 13.89 | 0.31 | 19 |
| Maximum Gape @ incisor (cm)[b] | 4.57 | 1.06 | 6 | 6.72 | 0.77 | 14 | 10.72 | 0.42 | 19 |
| Maximum Gape @ M1 (cm)[b] | 2.02 | 0.468 | 5 | 3.11 | 0.482 | 13 | 5.61 | 0.284 | 19 |
| Relative blade length (RBL) | 0.68 | 0.02 | 6 | 0.69 | 0.01 | 15 | 0.66 | 0.01 | 20 |
| Relative grinding area (RGA) | 1.36 | 0.09 | 5 | 1.28 | 0.02 | 15 | 1.34 | 0.02 | 19 |
| Facial Rotation (degrees) | 96.49 | 6.58 | 6 | 83.85 | 2.95 | 15 | 81.32 | 2.25 | 20 |
| Thomason biting force @ canine (N)[c] | 348.29 | 13.20 | 5 | 437.56 | 33.04 | 14 | 630.60 | 29.44 | 18 |
| Thomason biting force @ P1 (N) | 446.19 | 20.17 | 5 | 579.23 | 48.99 | 14 | 861.43 | 44.37 | 18 |
| Thomason biting force @ P2 (N) | 535.02 | 26.83 | 5 | 707.79 | 63.55 | 14 | 1070.90 | 57.95 | 18 |

TABLE 2-continued

Results for Mesaticephalic Dogs (Small, Medium & Large)

| | Mesaticephalic | | | | | | | | |
|---|---|---|---|---|---|---|---|---|---|
| | Small | | | Medium | | | Large | | |
| | Mean | SEM | n | Mean | SEM | n | Mean | SEM | n |
| Thomason biting force @ P3 (N) | 651.97 | 35.76 | 5 | 877.02 | 82.76 | 14 | 1346.65 | 75.87 | 18 |
| Thomason biting force @ P4 (N) | 780.83 | 45.71 | 5 | 1063.50 | 103.97 | 14 | 1650.49 | 95.63 | 18 |
| Thomason biting force @ M1 (N) | 982.35 | 61.35 | 5 | 1355.11 | 137.15 | 14 | 2125.64 | 126.54 | 18 |
| Thomason biting force @ M2 (N) | 1062.71 | 67.61 | 5 | 1471.41 | 150.39 | 14 | 2315.14 | 138.87 | 18 |
| Thomason biting force @ M3 (N) | 1100.94 | 70.58 | 5 | 1526.73 | 156.69 | 14 | 2405.27 | 144.74 | 18 |
| Kiltie biting force @ canine[c] | 308.51 | 39.07 | 6 | 414.81 | 23.53 | 14 | 591.22 | 24.66 | 18 |
| Kiltie biting force @ P1 | 436.61 | 43.40 | 5 | 544.48 | 34.91 | 14 | 799.32 | 37.81 | 18 |
| Kiltie biting force @ P2 | 522.58 | 60.37 | 5 | 662.14 | 45.47 | 14 | 988.17 | 49.81 | 18 |
| Kiltie biting force @ P3 | 635.76 | 82.79 | 5 | 817.04 | 59.51 | 14 | 1236.77 | 65.64 | 18 |
| Kiltie biting force @ P4 | 760.47 | 107.55 | 5 | 987.71 | 75.05 | 14 | 1510.69 | 83.10 | 18 |
| Kiltie biting force @ M1 | 955.49 | 146.31 | 5 | 1254.62 | 99.43 | 14 | 1939.06 | 110.42 | 18 |
| Kiltie biting force @ M2 | 1033.26 | 161.77 | 5 | 1361.07 | 109.17 | 14 | 2109.90 | 121.32 | 18 |
| Kiltie biting force @ M3 | 1070.26 | 169.13 | 5 | 1411.70 | 113.80 | 14 | 2191.16 | 126.50 | 18 |
| Total n | | | 6 | | | 15 | | | 20 |
| From OVC Dataset | | | 1 | | | 1 | | | 5 |
| From SWISS Dataset | | | 5 | | | 14 | | | 15 |
| Dogs | | | 1 | | | 9 | | | 7 |
| Bitches | | | 4 | | | 5 | | | 8 |
| Juvenile | | | 0 | | | 1 | | | 1 |
| Adult | | | 5 | | | 13 | | | 14 |

[a] The ratio of the distance from the rear of M3 to the rear of the skull/total skull length
[b] Adjusted using the equations of Thomason et. al, (2005)
[c] Adjusted using the equations of Thomason et. al, (2005)
* All variables are as per Table 2.0

TABLE 3

Results for Dolichocephalic Dogs (Small, Medium & Large)

| | Dolichocephalic | | | | | | | | |
|---|---|---|---|---|---|---|---|---|---|
| | Small | | | Medium | | | Large | | |
| | Mean | SEM | n | Mean | SEM | n | Mean | SEM | n |
| Skull Length (cm) | 10.55 | 0.69 | 15 | 16.58 | 0.72 | 13 | 19.06 | 1.42 | 8 |
| Jaw Length (cm) | 7.56 | 0.60 | 14 | 11.88 | 0.62 | 11 | 14.65 | 0.69 | 8 |
| Skull Width (cm) | 5.00 | 0.08 | 14 | 5.73 | 0.20 | 11 | 6.62 | 0.16 | 8 |
| ratio (estimated basicranial SL/SL)[a] | 0.42 | 0.01 | 15 | 0.42 | 0.00 | 13 | 0.43 | 0.01 | 8 |
| Max strength of canines (mm$^2$) Sx | 0.000098 | 0.000018 | 15 | 0.000874 | 0.000591 | 13 | 0.002282 | 0.001260 | 8 |
| Max strength of canines (mm$^2$) Sy | 0.000162 | 0.000031 | 15 | 0.001682 | 0.001140 | 13 | 0.004433 | 0.002527 | 8 |
| Relative Cape | 6.81 | 0.55 | 13 | 10.49 | 0.50 | 12 | 12.81 | 0.61 | 8 |
| Maximum Gape @ incisor (cm)[b] | 3.46 | 0.66 | 10 | 7.00 | 0.52 | 12 | 8.90 | 1.00 | 8 |
| Maximum Gape @ M1 (cm)[b] | 1.22 | 0.444 | 7 | 3.06 | 0.340 | 11 | 4.77 | 0.538 | 7 |
| Relative blade length (RBL) | 0.70 | 0.01 | 14 | 0.68 | 0.01 | 12 | 0.69 | 0.02 | 8 |
| Relative grinding area (RGA) | 1.27 | 0.06 | 14 | 1.17 | 0.08 | 13 | 1.28 | 0.12 | 8 |
| Facial Rotation (degrees) | 92.37 | 2.37 | 14 | 83.22 | 2.21 | 13 | 80.24 | 6.38 | 8 |
| Thomason biting force @ canine (N)[c] | 228.60 | 19.89 | 13 | 393.71 | 21.12 | 12 | 500.59 | 23.35 | 8 |
| Thomason biting force @ P1 (N) | 260.29 | 31.53 | 13 | 522.78 | 32.03 | 12 | 663.39 | 32.21 | 8 |
| Thomason biting force @ P2 (N) | 289.05 | 42.19 | 13 | 639.91 | 42.06 | 12 | 811.11 | 40.56 | 8 |
| Thomason biting force @ P3 (N) | 326.90 | 56.26 | 13 | 794.10 | 55.33 | 12 | 1005.58 | 51.77 | 8 |
| Thomason biting force @ P4 (N) | 368.61 | 71.80 | 13 | 963.99 | 69.99 | 12 | 1219.85 | 64.26 | 8 |
| Thomason biting force @ M1 (N) | 433.84 | 96.13 | 13 | 1229.68 | 92.96 | 12 | 1554.95 | 83.94 | 8 |
| Thomason biting force @ M2 (N) | 459.86 | 105.84 | 13 | 1335.64 | 102.13 | 12 | 1688.59 | 91.81 | 8 |
| Thomason biting force @ M3 (N) | 472.23 | 110.46 | 13 | 1386.04 | 106.49 | 12 | 1752.15 | 95.56 | 8 |
| Kiltie biting force @ canine[c] | 267.79 | 15.99 | 12 | 413.68 | 14.83 | 12 | 510.13 | 28.52 | 8 |
| Kiltie biting force @ P1 | 330.70 | 24.60 | 12 | 558.76 | 23.29 | 12 | 675.21 | 38.88 | 8 |
| Kiltie biting force @ P2 | 387.79 | 32.72 | 12 | 690.41 | 31.43 | 12 | 825.01 | 48.59 | 8 |
| Kiltie biting force @ P3 | 462.95 | 43.57 | 12 | 863.73 | 42.38 | 12 | 1022.22 | 61.56 | 8 |
| Kiltie biting force @ P4 | 545.76 | 55.61 | 12 | 1054.68 | 54.58 | 12 | 1239.51 | 75.98 | 8 |
| Kiltie biting force @ M1 | 675.27 | 74.53 | 12 | 1353.08 | 73.77 | 12 | 1579.32 | 98.67 | 8 |
| Kiltie biting force @ M2 | 726.91 | 82.10 | 12 | 1472.42 | 81.45 | 12 | 1714.84 | 107.75 | 8 |
| Kiltie biting force @ M3 | 751.48 | 85.69 | 12 | 1529.07 | 85.10 | 12 | 1779.30 | 112.07 | 8 |
| Total n | | | 15 | | | 13 | | | 8 |
| From OVC Dataset | | | 1 | | | 3 | | | 2 |
| From SWISS Dataset | | | 14 | | | 10 | | | 6 |

TABLE 3-continued

Results for Dolichocephalic Dogs (Small, Medium & Large)
Dolichocephalic

|  | Small | | | Medium | | | Large | | |
| --- | --- | --- | --- | --- | --- | --- | --- | --- | --- |
|  | Mean | SEM | n | Mean | SEM | n | Mean | SEM | n |
| Dogs |  |  | 5 |  |  | 4 |  |  | 3 |
| Bitches |  |  | 9 |  |  | 6 |  |  | 3 |
| Juvenile |  |  | 2 |  |  | 1 |  |  | 1 |
| Adult |  |  | 12 |  |  | 9 |  |  | 5 |

[a] The ratio of the distance from the rear of M3 to the rear of the skull/total skull length
[b] Adjusted using the equations of Thomason et. al, (2005)
[c] Adjusted using the equations of Thomason et. al, (2005)
* All variables are as per Table 2.0

In general, the results indicate that force of biting increased nonlinearly with size, was inversely proportional to face length, and was higher at molars (M1-M3) than canines. At the canine tooth, small, dolichocephalic dogs had the lowest mean bite force (228.6 N, SEM 19.89 N) and large brachycephalic dogs had the highest mean bite force (854.33 N, SEM, 43.75 N). As outlined in Tables 1-3, this pattern held true at other teeth as well.

Figure 5:
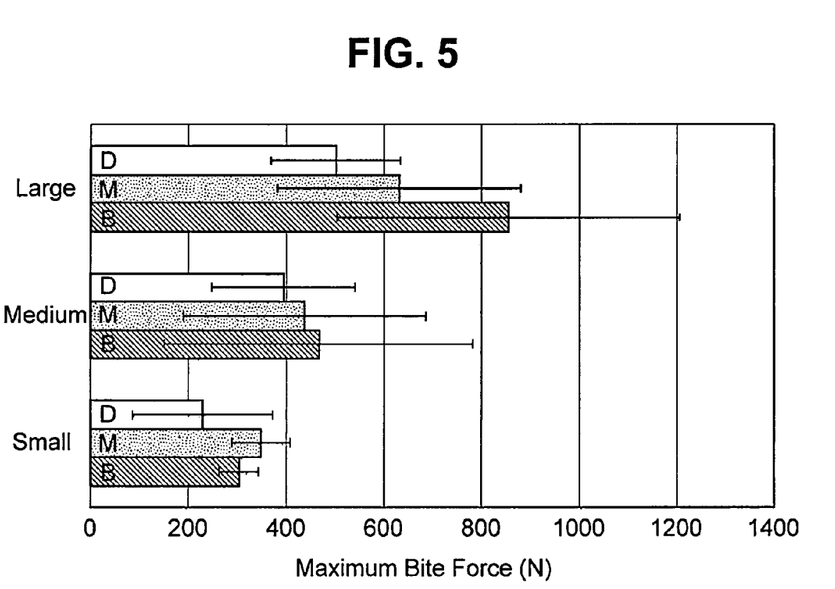
FIG. 5 is an outline of various bite forces calculated at the canine teeth in accordance with one embodiment of the present invention.
Figure 6:
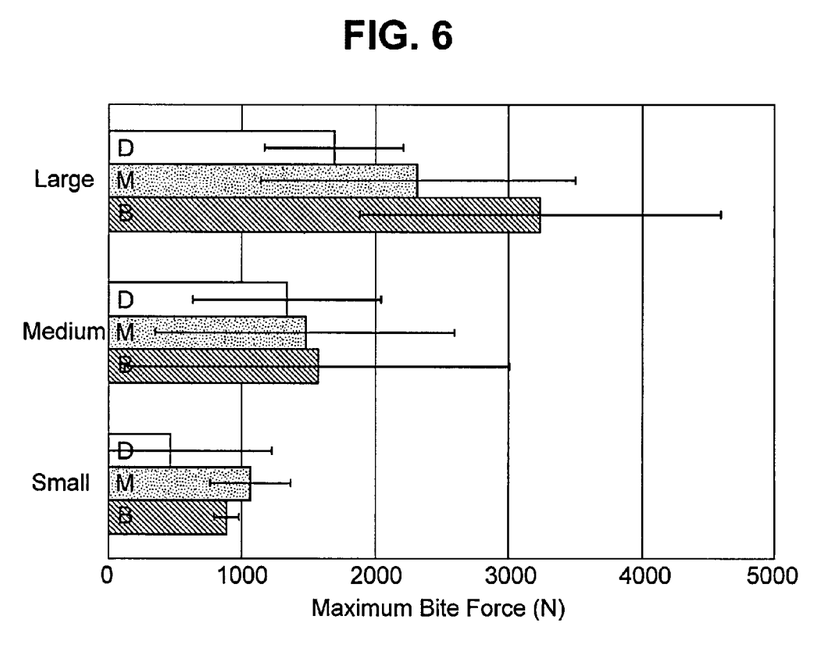
FIG. 6 is an outline of various bite forces calculated at a molar M2 in accordance with one embodiment of the present invention.

As mentioned earlier, information on differences in maximum biting force between skull shapes and sizes may be useful for optimizing oral product hardness geared towards specific classes of dogs. FIGS. 5 and 6 present graphical representations of the range of maximum biting forces at the canine and M2 molar teeth, respectively, that dogs of different size and skull shape are capable of exerting, plus or minus error bars that encompass the 95% confidence interval. In particular, the tables show maximum bite force (N) for small (<10 kg), medium (10-20 kg), and large (>20 kg) dogs of mesaticephalic (M), brachycephalic (B) or dolichocephalic (D) skull shape with 95% confidence bars, where bite forces were calculated using the adjusted Thomason (2005) equation. For a product of known hardness, requiring "X" N of force to break, these graphs may be used to determine, for instance, what class of dogs according to skull type would be capable of breaking it. To illustrate, a food product requiring 2000 N to break, processed at the second molar, would likely only be suitable for large dogs of the mesaticephalic (M) and brachycephalic (B) skull types but, may be too hard for large dolichocephalic (D) dogs. On the other hand, a food product requiring 1000N to break, processed at the second molar, would likely be crushable by medium and large, as well as small mesaticephalic dogs.

Maximum gape was calculated according to a modified version of the Emerson & Radinsky (1980) maximum relative gape formula at the canine and at M1, corrected to actual gape by the Thomason equation for small (<10kg), medium (10-20kg) and large (>20kg) dogs of brachycephalic, mesaticephalic and dolichocephalic skull shape. It should be noted that the Thomason was developed between predicted and observed maximum gapes at the incisors, but the equation was applied here to both incisor and M1 maximum gape estimates. Results are presented in Tables 1-3.

Information on maximum gape may be used for optimum oral product size determination. Averaging across skull sizes, average gape at M1 increased from 1.3 cm in small dogs, to 3.2 cm in medium sized dogs, to 5.5 cm in large dogs. At the incisors it increases from 3.7 cm in small dogs, to 6.3 cm in medium dogs and to 10.2 cm in large dogs. Depending on the size of dog, and the tooth at which food product is chewed, different size products would be more or less comfortable for different size dogs.

The maximum strength of the canine tooth, facial rotation, relative grinding area and relative blade length was also examined within each of the nine size-shape categories (Tables 1-3).

Relative grinding area (RGA) was measured in all skull type. RGA was highest in brachycephalic skulls averaged across size (1.44), and lowest for dolichocephalic skulls averaged across size (1.24). Relative grinding area is the area of the molars devoted to grinding versus the area of the molars devoted to slicing. Results indicate that brachycephalic skulls may have better grinding ability, while dolichocephalic skulls may have better slicing ability.

Upon completion of the biometric analyses, an oral product, e.g., a pet chew, is formulated according to the derived information, intended to meet all of the parameters for a given class of pet. Product performance of the formulated oral product based on the above biometric analysis is measured against a number of criteria including, but not limited to, textural attributes including hardness, density, elasticity, friability, water absorption capacity, and speed of solubilization, as well as functional criteria as perhaps plaque and tartar reduction, breath freshening, lasting time, and palatability as measured by paired preference.

Hardness

Texture measurements were performed with a TA.HDi Texture Analyzer (Texture Technologies Corp., Scarsdale, N.Y.) equipped with a 250-500 kg load cells. A 5 mm diameter cylindrical probe was used for uniaxial compression or puncture tests, and the tests were conducted at a room temperature of 25° C. Data was collected using the Texture Expert software (version 2.12) from Texture Technologies Corp. Two different uniaxial compression or puncture tests were run. These tests were selected because they best resemble the biting and chewing of the test samples by dogs.

The compression analysis parameters are as follows. Work (W) is defined as an estimate of work; and therefore shows the toughness of the product. A tough product will have a higher work value than a less tough product. The area shows the "force" or load that must be applied to the product to cause it to break. The area under the curve represents toughness. The expressed "Area" units come from the multiplication of y-axis per x-axis as N*mm. To convert "Area" to Work—W—(F/d) multiply by 0.1020408 m2/mm/s2.

The Max Force (N) is defined as the maximum amount of force needed to overcome the product's hardness. Usually a hard product will be associated with high ordinate (y-axis) values. The expressed "Force" unit derives from a direct association with mass weight in kg. To convert "Force" to "Max Force"—N—multiply by 9.81 m/s2 (the acceleration of gravity).

Travel (mm) is represented as the point (distance) at which the peak force is reached. Thus it emulates the resistance of the product as a combination between toughness and hardness, in addition to elasticity, attributed to a measurement of how far the probe has traveled to reach the maximum force. Larger travel numbers are indicative of more elastic products. Resistance to breaking is directly proportional to travel values.

Linear Distance (mm) is calculated by measuring the length of an imaginary line pulled taunt joining all the trajectory points. This measure describes crumbly verses cohesive product attributes. It is a direct assessment of brittleness where a brittle product will produce more sharp peaks, resulting in a higher linear distance.

The values of hardness, toughness, and elasticity were determined using whole product samples. A base platform, as observed with the TA.HDi, provided by Texture Technologies, was used to measure force/distance.

The sample was centered on the platform such that the knife will contact one location along the sample bone length at a time. Chosen locations included the brush head, the joint of the shaft to the brush head and the knuckle at the end of the shaft of the pet chew. Each location is contacted with the knife at a 90° angle while the sample is laying on its side placed on a flat surface. This is repeated at the three chosen locations along the length of the bone. A minimum of 5 bones were measured per evaluated variable, with each of the following conditions.

Two sets of tests were conducted with the following parameters:

A. The probe or knife is run at a (1) pre test speed of 5 mm/s (speed of probe before contacting sampling); (2) a test speed of 2 mm/s (speed of probe while travelling within the sample); (3) a post test speed of 5 mm/s (speed that the probe is withdrawn from the sample); and a distance of 50% compression (distance that probe travels within the sample until it is withdrawn).

B. The probe or knife is run at a (1) pre test speed of 5 mm/s (speed of probe before contacting sampling); (2) a test speed of 10 mm/s (speed of probe while travelling within the sample); (3) a post test speed of 5 mm/s (speed that the probe is withdrawn from the sample); and a distance of 50% compression (distance that probe travels within the sample until it is withdrawn).

The force in kg (y axis) is plotted against distance in mm (x axis) in which the starting force of 0 is 1 and the Max Force is 2. The following parameters were measured: the Max Force 2, which is the maximum force value of the curve, is a measurement of hardness; the Linear Distance (mm), is calculated by measuring the length of an imaginary line pulled taunt joining all the trajectory points. It is a direct assessment of brittleness where a brittle product will produce more sharp peaks, resulting in a higher linear distance. For each of these parameters, the measurement was the average of the values of at least 5 samples of the product tested.

Hardness is measured as Max Force in N. As measured in the uniaxial compression or puncture test, the hardness or max force value of the inventive product, in certain embodiments, for the inventive pet chew is about 100 to about 700 Newtons, preferably about 150 to about 600 Newtons, more preferably about 200 to about 500 Newtons and most preferably about 250 to about 400 Newtons when the pet chew is designed for a dog that weighs less than 11.4 kg (25 lbs) or about 200 to about 800 Newtons for a pet chew designed for a dog that weighs 11.4 kg (25 lbs) or more measured as described above using a probe speed of 2.0 mm/sec. In a preferred embodiment, the pet chew designed for a dog that weighs 11.4 kg or more has a hardness measurement of about 250 to about 650 Newtons, preferably about 275 to about 600 Newtons, and more preferably about 300 to about 450 Newtons measured using a probe speed of 2.0 mm/sec.

The toughness measured as Newtons×mm (Nmm) of the inventive product has a range of about 500 to about 12,000 Nmm, a preferred range of about 700 to about 10,000 Nmm, and a more preferred range of about 800 to about 5000 Nmm.

The brittleness or linear distance of the inventive product was measured. The brittleness value of the inventive product has a range of about 100 to about 1500 mm, a preferred range of about 150 to about 1300 mm, and a most preferred range of about 200 to about 1000 mm.

Solubility

The in vitro measurement of solubility/digestibility of a pet chew may be used to indicate the amount of the pet chew that would solubilize or be digested in the gastrointestinal tract of a pet, and particularly a dog. The test performed is based on a portion or whole piece of a pet chew product. A particular size portion or piece, e.g., a 32-gram pet chew portion, may be used so that different formulations can be accurately compared. The outcome is expressed as percent (%) in vitro disappearance (IVD). The solubility measurement is performed by subjecting a specific amount of product to a number of solutions which represent the stomach and intestinal environments of a pet. Generally, the stomach environment is relatively acidic and the intestinal environment is relatively more alkaline compared to the stomach. After subjecting the product to these environments, any product left is filtered and dried. This leftover product is weighed and compared with the weight of the initial product. Percent IVD is the percentage of the weight of the dissolved product in comparison to the weight of the initial product. The solubility test is further described below.

Solutions Utilized:

Phosphate Buffer, 0.1M, pH 6.0 Solution: 2.1 grams of sodium phosphate dibasic, anhydrous, and 11.76 grams of sodium phosphate monobasic, monohydrate were dissolved in a 1 liter volumetric flask and brought up to volume with distilled/deionized (dd) water.

HCl Solution: 17.0 ml concentrated HCl was added to a 1 liter volumetric flask containing 500 ml dd water and brought up to volume with dd water. When 100 ml of HCl:pepsin is added to 250 ml of phosphate buffer, the pH should be close to 2.0. One way to achieve this is to use 850 ml of 0.1 N HCl+150 ml of 1 N HCl to make 1000 ml of HCl stock solution. When 100 ml of HCl:pepsin is added to 250 ml phosphate buffer, the pH of the solution is about 1.9-2.0.

HCl:Pepsin Solution: The appropriate amount of pepsin (Sigma P-7000, pepsin amount is dependent on sample size being tested. 0.01 gram pepsin per 1 gram sample must be obtained in the final mixture at Step 6 of the procedure. For example 0.3 gram pepsin would be used for 30 grams sample) was placed in a 1 liter volumetric flask and brought up to volume with the HCl solution made above.

Chloramphenicol Solution: 0.5 gram chloramphenicol (Sigma C-0378) was brought up to volume in a 100 ml volumetric flask with 95% ethanol.

Sodium Hydroxide Solution, 0.5N: 20 grams NaOH was brought up to volume in a 1 liter volumetric flask with dd water.

Phosphate Buffer, 0.2M, pH 6.8 Solution: 16.5 grams of sodium phosphate dibasic, anhydrous, and 11.56 grams of sodium phosphate monobasic, monohydrate were dissolved in a 1 liter volumetric flask and brought to volume with distilled water.

Pancreatin:Phosphate Buffer Solution: The appropriate amount of porcine pancreatin (Sigma P-1750, enzyme amount is dependent on sample size being tested. 0.05 gram porcine pancreatin per 1 gram sample must be obtained in the final mixture of Step 8. For example, 1.5 grams of pancreatin would be used for 30 grams samples) was dissolved in a 500 ml volumetric flask and brought up to volume with 0.2M, pH 6.8 phosphate buffer solution made above.

Procedure Example:

1. Place numbered pieces of dacron fabric in a 57° C. oven overnight and weigh the next day.
2. Weigh samples into Erlenmeyer flasks. (Weigh additional sample to dry as a control along with residue to account for moisture loss during %IVD calculation).
3. Add 250 ml 0.1M pH6.8 Phosphate Buffer Solution to each flask.
4. Add 100 ml HCl:Pepsin Solution to each flask. Check that the pH of the mixture is about 2. Adjust with HCl if needed.
5. Add 5 ml Chloramphenicol Solution to each flask.
6. Stopper the flasks. Mix gently. Incubate at 39° C. for 6 hours. Mix on a regular basis using a shaking water bath, set at a speed that causes the samples to constantly move in the flask while keeping the products submerged in the solution.
7. After incubation, add enough 0.5N Sodium Hydroxide Solution to each flask to reach a final pH of 6.8 for the mixture.
8. Add 100 ml Pancreatin: Phosphate Buffer Solution to each flask. Mix gently.
9. Stopper the flasks. Incubate at 39° C. for 18 hours. Mix on a regular basis using a shaking water bath, set at a speed that causes the samples to constantly move in the flask while keeping the products submerged in the solution.
10. Filter the sample through tared pieces of dacron fabric from Step 1. Rinse three times with dd water. Maintain at 57° C. until constant weight is reached.
11. Record pH at the following stages:
  a. At step 4.
  b. After 6 hours of digestion.
  c. After addition of NaOH solution at step 7.
  d. After addition of pancreatin:phosphate buffer solution.
  e. After 24 hours.

Calculations:

Residue Weight=(Filter+Sample weight after incubation)−Dry filter weight $$\% \ IVD = 1 - \frac{(\text{Sample residue weight}) - (\text{Blank residue weight})}{\text{Dry matter weight}} \times 100$$

III. Example Implementation

An exemplary oral canine product was developed in accordance with a biometric analysis according to the present invention.

In the present example, the product is intended for all small dogs less than 10 kg of body weight including dogs of all skull types. The desired chewing location within the dogs' mouth is from the second premolar back through the molars.

To formulate a product that would meet the above target class of dogs, Maximum Bite Forces of dogs in this class from all skull types should be examined, as outlined below. Specifically, Table 4 illustrates Mean Bite Forces of Dogs under 10 kg body weight. This includes the Mean Bite Force of dogs in each skull category in this class of dogs as well as the estimated lowest bite force in this group of dogs. This estimate was calculated by taking 70% of the Mean Bite Force to represent the lower end of the population.

TABLE 4

| | Dog size: Small (Dogs <10 Kg) | | | | | |
|---|---|---|---|---|---|---|
| | Brachycephalic | | Mesaticephalic | | Dolichocephalic | |
| Skull and Jaw size | Mean BF in Population | Estimated Lowest BF in Population | Mean BF in Population | Estimated Lowest BF in Population | Mean BF in Population | Estimated Lowest BF in Population |
| Gape (Tooth to Tooth) | | | | | | |
| Maximum Gape @ incisor (mm) | 31.01 | 21.77 | 45.70 | 31.99 | 34.60 | 24.22 |
| Maximum Gape @ molar M1 (mm) | 6.50 | 4.55 | 20.20 | 14.14 | 12.20 | 8.54 |
| Biting force at each tooth | | | | | | |
| Thomason biting force @ canine (N) | 303.03 | 212.12 | 348.29 | 243.80 | 228.60 | 160.02 |
| Thomason biting force @ P1 (N) | 388.82 | 272.17 | 446.19 | 312.33 | 260.29 | 182.20 |
| Thomason biting force @ P2 (N) | 459.75 | 321.83 | 535.02 | 374.51 | 289.05 | 202.34 |
| Thomason biting force @ P3 (N) | 553.13 | 387.19 | 651.97 | 456.38 | 326.90 | 228.83 |
| Thomason biting force @ P4 (N) | 656.02 | 459.21 | 780.83 | 546.58 | 368.61 | 258.03 |
| Thomason biting force @ M1 (N) | 816.93 | 571.85 | 982.35 | 687.65 | 433.84 | 303.69 |

TABLE 4-continued

| | Dog size: Small (Dogs <10 Kg) | | | | | |
|---|---|---|---|---|---|---|
| | Brachycephalic | | Mesaticephalic | | Dolichocephalic | |
| Skull and Jaw size | Mean BF in Population | Estimated Lowest BF in Population | Mean BF in Population | Estimated Lowest BF in Population | Mean BF in Population | Estimated Lowest BF in Population |
| Thomason biting force @ M2 (N) | *881.10* | *616.77* | *1062.71* | *743.90* | *459.86* | *321.90* |
| Thomason biting force @ M3 (N) | *911.62* | *638.13* | *1100.94* | *770.66* | *472.23* | *330.56* |

Product designed to fit dogs <10 kg body weight of all skull types and to be chewed at the teeth from the 2nd premolar and back.
Chosen Product Targets: Texture = 202N, Contains A Thickness Point <4.5 mm.
Bold italic numbers in the table indicate that Target Product Parameters will be acceptable for those teeth and skull types.

Using this biometric information as well as the desired chewing location of the present example, it can be determined that a product having a hardness of 202 N will be chewable by all dogs in this class and of all skull types by all teeth from the second premolar back through the molars. In addition, the product should contain a point where the thickness is <4.5 mm so that the product can be chewed between the molars.

To achieve the above-described texture, the following formulation was developed. The present formulation, described in more detail in Provisional Application No. 60/815,682, filed Jun. 21, 2006, the entire contents of which are herein incorporated by reference, is provided to illustrate merely one product made according to an embodiment of the present invention, without in any way limiting the invention. Indeed, many kinds of oral pet products, including variations in the same product line, may be formulated according to the methods described herein.

TABLE 1

Product Formulation

| Ingredients | Weight percent |
|---|---|
| Wheat Protein Isolate | 17% |
| Soy Protein Isolate | 14% |
| Sodium Caseinate | 8% |
| Glycerin | 17% |
| Hydrogenated Starch Hydrolysate | 9% |
| Gelatin (100 Bloom) | 17% |
| Water | 7% |
| Vegetable Oil | 3% |
| Flavor/Nutrients/Preservatives/Colorant | 8% |

Of course, it should be noted that the methods and examples outlined herein for using various biometric analyses are not limited to application with regard to any one function, class of animal, or capability, but may instead be manipulated in accordance with the spirit of the invention.

What is claimed is:

1. A method of designing an oral dog product that has a desired textural characteristic and is safe and functionally effective for a class of dogs, said method comprising the steps of:
    analyzing at least two variables from capabilities of a class of dogs using biometric analysis; and
    making and/or shaping a product having a desired textural characteristic for the class of dogs based on biometric analysis of the at least two variables of capabilities of the class of dogs.

2. The method of claim 1, wherein the oral dog product also has a desired shape and wherein the shape is also based on the biometric analysis of the at least two variables of capabilities of the class of dogs.

3. A method of marketing an oral dog product that is safe and functionally effective for a class of dogs, said method comprising the step of: marketing a product based on biometric analysis of the capabilities of the class of dogs, wherein the biometric analysis analyzes, by a computer, at least two variables from the capabilities from a class of dogs in order to make an oral dog product having a desired textural characteristic and is safe and functionally effective for the class of dogs.

4. The method of claim 3, wherein the oral dog product also has a desired shape and wherein the shape is also based on the biometric analysis of the at least two variables of capabilities of the class of dogs.

5. The method of claim 1 or 3, wherein the class of dogs is defined according to skull type.

6. The method of claim 1 or 3, wherein the class of dogs is defined according to breed.

7. The method of claim 1 or 3, wherein the class of dogs is defined according to age.

8. The method of claim 1 or 3, wherein the class of dogs is defined according to body weight.

9. The method of claim 1 or 3 wherein the class of dogs is defined according to chewing style.

10. The method of claim 1 or 3, wherein the variable analyzed is bite force.

11. The method of claim 10, wherein the bite force is analyzed according to the steps of:
    a. measuring a set of variables;
       calculating a bite force BF using said variables according to the equation $$BF = 2(M*m + T*t)/o$$

c. converting said BF into at least one characteristic of texture and/or shape;
    d. selecting ingredients to satisfy said at least one characteristic; and
    e. formulating the oral dog product with said ingredients;
    wherein M is an area proportional to the masseter/medial pterygoid muscle*30 Mpa, T is an area proportional to the temporalis muscle*30 Mpa, m is a lever arm for M, o is a jaw length, and t is a lever arm for T.

12. The method of claim 1 or 3, wherein the variable analyzed is mouth gape.

13. The method of claim 1 or 3, wherein the variable analyzed is chewing surface.

14. The method of claim 1 or 3, wherein the variable analyzed is tooth morphology.

15. The method of claim 1 or 3, wherein the product comprises edible chews, non-edible chews, edible snacks or treats, toys, and kibbles.

16. The method of claim 1 or 3, wherein a function of the product is oral care.

17. The method of claim 1 or 3, wherein a function of the product is chewing enjoyment.

18. The method of claim 1 or 3, wherein a function of the product is occupancy.

19. A method of designing an oral dog product that is safe and functionally effective for a plurality of classes of dogs, said method comprising the steps of:

formulating at least two different products within a product line for at least two different classes of dogs based on biometric analysis of at least two variables of the capabilities of the at least two classes of dogs, wherein the at least two different products are formulated to have different desired textures based on the biometric analysis, and wherein at least a portion of the biometric analysis is conducted using a computer processing unit.

20. The method of claim 19, wherein the oral dog product also has a desired shape and wherein the shape is also based on the biometric analysis of the at least two variables of capabilities of the class of dogs.

21. A method of marketing an oral dog product that is safe and functionally effective for a plurality of classes of dogs, said method comprising the step of:

marketing at least two different products within a product line for at least two different classes of dogs based on biometric analysis of at least two variables of the capabilities of the at least two classes of dogs, wherein the at least two different products are formulated to have different desired textures based on the biometric analysis, wherein at least a portion of the biometric analysis is conducted using a computer processing unit.

22. The method of claim 21, wherein the at least two different products are also formulated to have different desired textures shapes based on the biometric analysis.

23. The method of claim 19 or 21, wherein the class of dogs is defined according to skull type.

24. The method of claim 19 or 21, wherein the class of dogs is defined according to breed.

25. The method of claim 19 or 21, wherein the class of dogs is defined according to age.

26. The method of claim 19 or 21, wherein the class of dogs is defined according to body weight.

27. The method of claim 19 or 21, wherein at least one variable analyzed is bite force.

28. The method of claim 19 or 21, wherein at least one variable analyzed is mouth gape.

29. The method of claim 19 or 21, wherein at least one variable analyzed is chewing surface.

30. The method of claim 19 or 21, wherein at least one variable analyzed is tooth morphology.

31. The method of claim 19 or 21, wherein the product comprises edible chews, non-edible chews, edible snacks or treats, toys, and kibbles.

32. The method of claim 19 or 21, wherein the function of the product is oral care.

33. The method of claim 19 or 21, wherein the function of the product is chewing enjoyment.

34. The method of claim 19 or 21, wherein the function of the product is occupancy.

35. A method of making an oral dog product having a desired textural characteristic that is safe and functionally effective for a specific class of dogs, said method comprising the steps of: a. selecting a skull type of the dog; b. selecting a size of the dog; c. selecting a desired chew location within the dog's mouth; d. determining bite force based on selection criteria of steps a-c; e. selecting a variable from group consisting of mouth gape, chewing surface, tooth morphology, and combinations thereof; and f. making a dog chew with a specific textual characteristic, based on a biometric analysis of the bite force of the specific class of dogs in combination with the variable.

36. The method of claim 35, wherein the oral dog product is also made to have a desired shape.

\* \* \* \* \*